United States Patent [19]
Schmitt et al.

[11] Patent Number: 5,909,025
[45] Date of Patent: Jun. 1, 1999

[54] CHIP CARD READER WITH TORSION LEVER

[75] Inventors: Jochen Schmitt, Weiterstadt; Reinhard Lotz, Erhausen, both of Germany

[73] Assignee: Thomas & Betts Corporation, Memphis, Tenn.

[21] Appl. No.: 08/718,365

[22] PCT Filed: Jan. 24, 1996

[86] PCT No.: PCT/EP96/00277

§ 371 Date: Feb. 13, 1997

§ 102(e) Date: Feb. 13, 1997

[87] PCT Pub. No.: WO96/23271

PCT Pub. Date: Aug. 1, 1996

[30] Foreign Application Priority Data

Jan. 25, 1995 [DE] Germany .................. 195 02 176

[51] Int. Cl.$^6$ .................. G06K 7/00; G06K 13/00
[52] U.S. Cl. .................. 235/492; 235/441; 235/482; 235/483; 235/486
[58] Field of Search .................. 235/441, 482, 235/486, 483, 492

[56] References Cited

U.S. PATENT DOCUMENTS

| | | | |
|---|---|---|---|
| 4,743,746 | 5/1988 | Murschall et al. | 235/486 |
| 4,839,509 | 6/1989 | Yasuma et al. | 235/482 |
| 4,932,889 | 6/1990 | Bleier et al. | 235/482 |
| 4,940,418 | 7/1990 | Shimizu et al. | 235/486 |
| 4,984,994 | 1/1991 | Yamamoto | 235/482 |
| 5,012,078 | 4/1991 | Pernet | 235/483 |
| 5,198,645 | 3/1993 | Martin et al. | 235/441 |
| 5,225,653 | 7/1993 | Martin et al. | 235/482 |
| 5,286,957 | 2/1994 | Defrasne | 235/482 |
| 5,369,259 | 11/1994 | Bleier et al. | 235/441 |

FOREIGN PATENT DOCUMENTS 399763  11/1990  European Pat. Off. .............. 235/441

*Primary Examiner*—Anita Pellman Gross
*Assistant Examiner*—Douglas X. Rodriguez
*Attorney, Agent, or Firm*—Hoffmann & Baron, LLP

[57] ABSTRACT

A reader for chip cards with a housing (3) featuring an insertion slot (1) for the chip card (2), a number of pairs of contacts (6,7) corresponding to the number of read tracks, and a contact support frame (5) connected to the contact lead-ins (4), in which the contact lead-ins (4) held in the housing (3) are inserted in parallel from one side into the contact support frame (5) held in a free suspension by the contact lead-ins (4). On the side of the contact support frame (5) turned away from the contact lead-ins (4) there is an actuator element designed as a double arm lever (9, 10). The actuator element is held in the housing (3) by a transverse torsion spring arm (8) and its power arm (9) lies in the insertion path of the chip card (2) such that the work arm (10) of the actuator lever is twisted during insertion of the chip card (2) under tension of the torsion spring arms (8) and the contact support frame (5) and thus its associated contacts (6,7) are pressed against the chip card (2). The contact support frame (5) is provided with lateral pins (14) and the work arm (10) of the actuator element (8, 9, 10) is designed as a fork whose tines in their released position rest loosely upon the pins (14).

5 Claims, 3 Drawing Sheets

CHIP CARD READER WITH TORSION LEVER

TECHNICAL FIELD

The invention is based on a reader for chip cards according to the preamble of claim 1.

BACKGROUND OF THE INVENTION

From U.S. Pat. No. 4,976,630 a reader of this kind has become known in which the frame is held in a stable position by means of the contact lead-ins introduced into the frame from mutually opposing sides. In this known chip card reader, the chip card impacts against the tang of a skid upon insertion into the insertion slot and entrains it upon further insertion, so that the skid slides along a ramp and thus is lifted so that the conductors of the chip will rest against the contacts. The disadvantage of the known reader consists in its complicated design, and in particular, the contact module must be connected with a source of electric power by means of a flexible line, so that the device has an increased susceptibility to interference.

In addition, a reader for chip cards with fixed contacts is known, but where the contacts scrape along the card along the entire insertion length and thus it is used only in special cases.

SUMMARY OF THE INVENTION

The present invention is based on the problem of creating a reader for chip cards in which the scraping of the contacts across the card and in particular the chip is prevented during insertion of the card.

This problem is solved by a reader for chip cards with the properties presented in claim 1.

By means of this invention, a reader for chip cards is created in which the electrical contact is not established by the approach of the card to the contacts due to lateral deflection of a linearly moving skid by means of a ramp, but rather conversely, by pivoting the contacts in the direction on the card, while the contact frame holding the contacts in their opposing position is not held in a stable, fixed position in the contact lead-ins, but rather is held in an elastically yielding manner, so that, in addition to performing their assigned electrical function, these lead-ins form an elastic support of the frame and thus of the contacts stabilized in their opposing position. A displacement of the contacts on the card does not occur, i.e., the contact of the contacts against the card and/or the microchip, takes place directly before reaching the end position of the card. In this case, another significant advantage is that the actuator element held on torsion spring arms likewise performs two functions, namely to press down the frame holding the contacts upon insertion of the chip card, and secondly, the fixed (elastic) clamping of the chip card in its insertion position. Consequently, the reader has an exceptionally simple design consisting of only a few parts and this will simplify its assembly.

One significant advantage of the invented microchip reader is also that, because of the parallel arrangement of the contact lead-ins from the side of the insertion slot, a "back-engaging" of the contacts is avoided, thus preventing bending of the contacts and consequent damage to the structural and operational integrity of the device. It is important to note that this configuration enables electrical attachment of the contacts in any manner that is conducive to the operation of the device, including insulation displacement connection, press-in technology, SMD technology or soldering.

BRIEF DESCRIPTION OF THE DRAWINGS

Additional details of the invention characterized in the claims will be explained on the basis of the attached figures. We have:

DESCRIPTION OF THE PREFERRED EMBODIMENT

Figure 1:
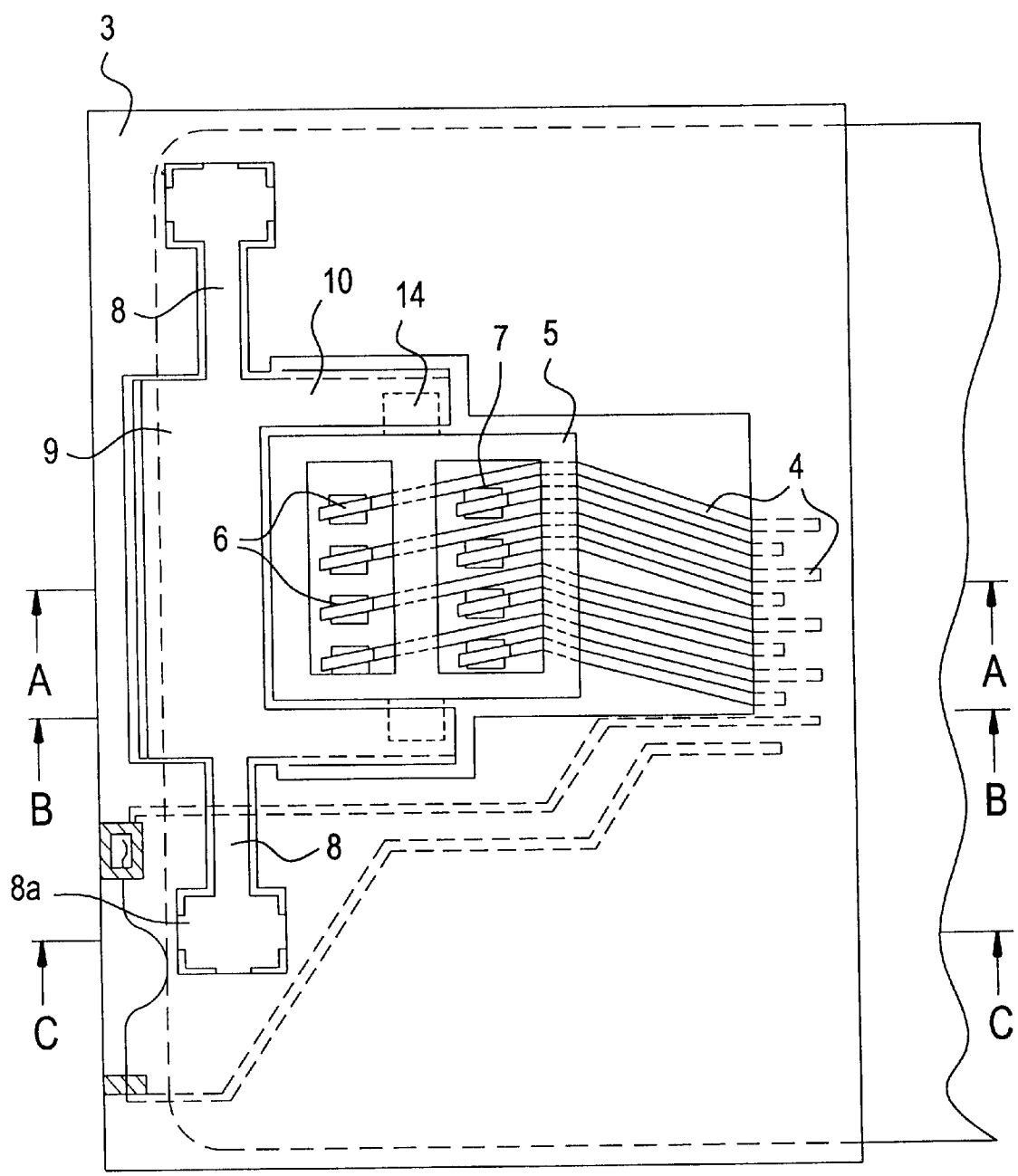
FIG. 1 a view of the contact device of a chip card reader according to the invention.
Figure 2:
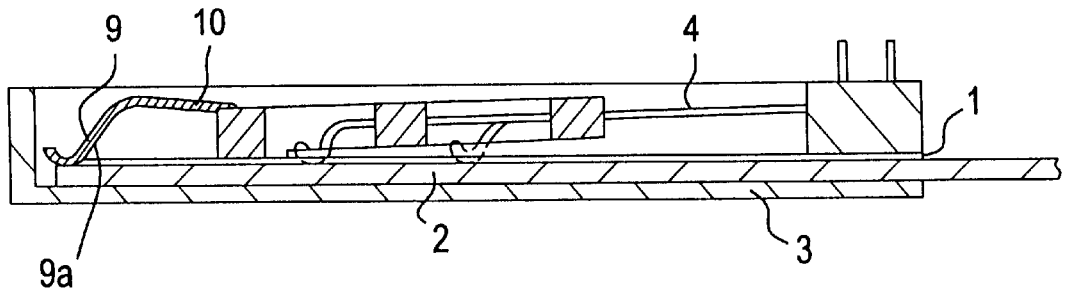
FIG. 2 a cross section along A—A through FIG. 1.
Figure 3:
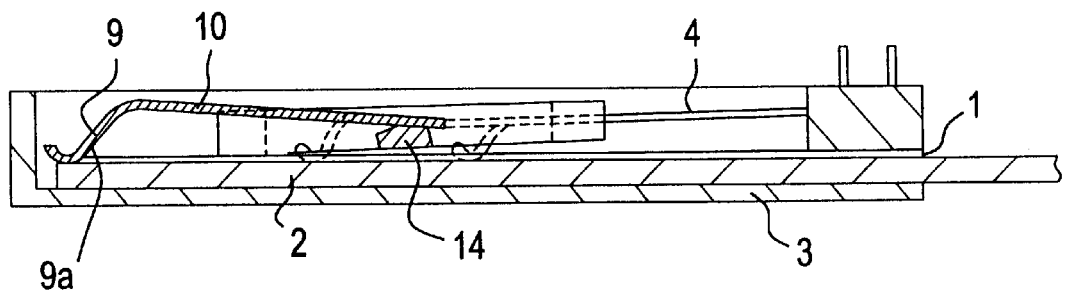
FIG. 3 a cross section along B—B through FIG. 1.
Figure 4:
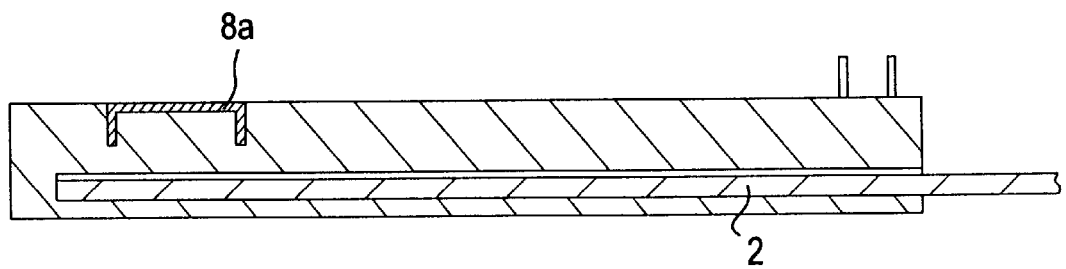
FIG. 4 a cross section along C—C through FIG. 1.

The reader for chip cards presented in the figures consists of a housing 3 with an insertion slot 1 for the chip card 2 and of a number of pairs of contacts 6, 7 corresponding to the number of read tracks; these contacts are connected by means of contact lead-ins 4 to the reader electronics (not illustrated). A contact support frame 5 is connected to the contact lead-ins 4; the primary purpose of this frame is to hold the contacts 6, 7 in their position necessary for reading of the chip data.

The contact lead-ins 4 held in the housing 3 are inserted in parallel from one side into the contact support frame 5 held in a freely elastic manner and on the side of the contact support frame 5 turned away from the contact lead-ins 4, there is an actuator element formed as a double-arm lever 9, 10; in the illustrated sample design; the arrangement is set up so that the contact lead-ins 4 are inserted from the side of the insertion slot 1 into the contact support frame 5 and the actuator element 8, 9, 10 accordingly is located on the side of the contact support frame 5 turned away from the insertion slot 1 for the chip card. This arrangement has the advantage that on the one hand, a back-engaging and thus a bending of the contacts by the chip card is prevented and on the other hand,. in contrast to the known chip card readers, the electric attachment of the contacts can take place in any particular manner, i.e., optionally by means of insulation displacement connection, press-in technology, SMD technology or soldering.

The actuator element is held in the housing 3 by means of transverse torsion spring arms 8, with the power arm 9 situated in the insertion path of the chip card 2 in such a manner that the work arm 10 is twisted upon insertion of the chip card 2 under tension of the torsion spring arms 8 and the contact support frame 5 and thus its associated contacts 6, 7 are pressed against the chip card 2. For this purpose the contact support frame 5 is provided with lateral pins 14 and the work arm 10 of the actuator element 8, 9, 10 is designed as a fork whose arms loosely contact the pins 14 in the release position.

Figure 5:
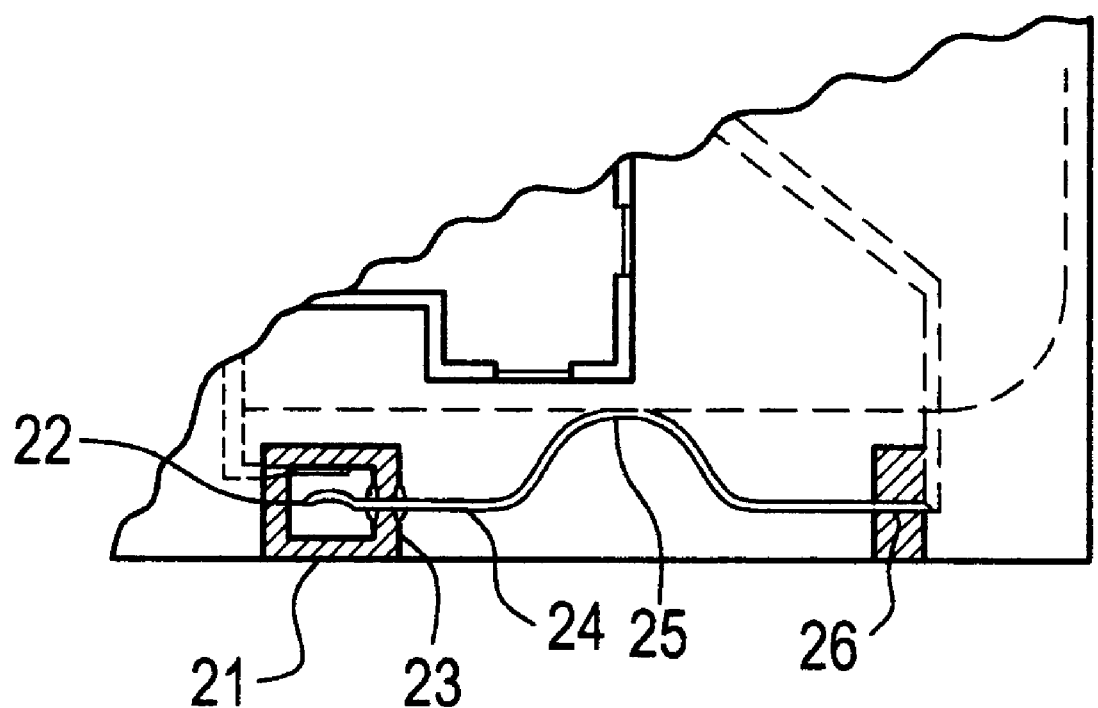
FIG. 5 a view of the limit switch of the chip card reader.

Finally (see FIG. 5), the reader is equipped with a limit switch with moving contact 22 located, in a possibly encapsulated contact housing 21 (see FIG. 5); the resilient guide 24 is seated by means of an elastically pivoting element 23 in the wall of the contact housing 21 and is provided in the region between its bearings 23 and 25 (roughly in the plane of the power arm 9 of the actuator element) with a cam 26 located in the insertion path for the chip card 2.

To operate the reader, the chip card 2 is inserted into the slot 1 of the reader until it contacts the power arm 9 of the actuating lever 9, 10 and the cam 26, virtually at the same time. Upon further insertion and under the tension of the torsion spring arms 8, there occurs a pivoting of the actuator lever 9, 10, whose work arms 10 press the frame 5 and thus the contacts 6, 7 downward onto the pins 14 practically parallel onto the card. Scraping of the contacts does not occur in this case, or such occurs only to a limited extent which is indispensable for cleaning of the contacts. At the same time, as a result of the pivoting of the resilient guide about the bearing 23, the contact 22 is closed and thus the read function is triggered.

We claim:

1. A reader for chip cards with a housing (3) featuring an insertion slot (1) for the chip card (2), a of pairs of contacts (6,7) corresponding to a plurality of read tracks, and a contact support frame (5) connected to contact lead-ins (4), characterized in that contact support frame (5) is held in a free suspension by contact lead-ins (4) attached in housing (3), and to operate contact support frame (5), a double-arm lever comprising power arm (9) and work arm (10) seated in housing (3) by means of torsion spring arms (8) is provided; power arm (9) of said double arm lever is provided with an inclined ramp (9*a*) in the insertion path of chip card (2) in such a manner that upon insertion of the chip card (2) into the slot (1), inclined ramp (9*a*) slides down into an end position under rotation of said double-arm lever and also tensioning of torsion spring arms (8) at edges of the card; in this end position both contact support frame (5*a*) held down by work arm (10) of said double-arm lever, and thus contacts (6, 7) as well as an end of inclined ramp (9*a*) contact chip card (2) from above and, on the one hand, press contact support frame (5) onto chip card 2 and, on the other hand, press contacts (6, 7) into their corresponding read tracks.

2. A reader for chip cards according to claim 1, characterized in that contact lead-ins (4) are inserted from a side of insertion slot (1) into contact support frame (5) and an actuator element including torsion spring arms (8), power arm (9) and work arm (10) is located on a side of contact support frame (5) turned away from insertion slot (1) for chip card (2).

3. A reader for chip cards according to claim 1 or 2, characterized in that contact support frame (5) is provided with lateral pins (14) and work arm (10) is designed as a fork whose arms in their release setting loosely contact pins (14).

4. A reader for chip cards according to claim 1 or 2, characterized in that in housing (3) there is a limit switch enclosed by a preferably encapsulated contact housing (21); moving contacts (22) of said limit switch is located in the insertion path for chip card (2) for the purpose of actuation.

5. A reader for chip cards according to claim 4, characterized in that moving contact (22) is seated by means of an elastically, pivoting element (23) in the wall of contacts housing (21).

\* \* \* \* \*